(12) United States Patent
Yeo et al.

(10) Patent No.: US 11,807,327 B1
(45) Date of Patent: Nov. 7, 2023

(54) APPARATUS AND METHOD FOR PERFORMING GENERATION OF DRIVING INFORMATION AND DRIVER-SPECIFIC START CONTROL FOR TWO-WHEELED VEHICLE ON BASIS OF BIOMETRIC RECOGNITION

(71) Applicant: GREENRIDEAINTOP CORP., Seoul (KR)

(72) Inventors: Tae Hwan Yeo, Seoul (KR); Bong Sup Lee, Seoul (KR)

(73) Assignee: GREENRIDEAINTOP CORP., Seoul (KR)

( * ) Notice: Subject to any disclaimer, the term of this patent is extended or adjusted under 35 U.S.C. 154(b) by 0 days.

(21) Appl. No.: 18/336,092

(22) Filed: Jun. 16, 2023

Related U.S. Application Data

(63) Continuation of application No. PCT/KR2021/002375, filed on Feb. 25, 2021.

(30) Foreign Application Priority Data

Dec. 16, 2020 (KR) .......................... 10-2020-0176711

(51) Int. Cl.
*B62H 5/08* (2006.01)
*B62J 45/416* (2020.01)
(Continued)

(52) U.S. Cl.
CPC .................. *B62H 5/08* (2013.01); *B62H 5/20* (2013.01); *B62J 45/416* (2020.02); *B62J 50/22* (2020.02); *G07C 5/008* (2013.01); *G07C 5/02* (2013.01)

(58) Field of Classification Search
CPC .. B62H 5/08; B62H 5/20; B62J 45/416; B62J 50/22; G07C 5/008; G07C 5/02
See application file for complete search history.

(56) References Cited

U.S. PATENT DOCUMENTS

2014/0257873 A1* 9/2014 Hayward ........... G06Q 30/0208
705/4
2014/0279587 A1 9/2014 Gafford
(Continued)

FOREIGN PATENT DOCUMENTS

JP          2012153246 A      8/2012
JP          2013233845 A      11/2013
(Continued)

OTHER PUBLICATIONS

International Search Report (English Translation) and Written Opinion issued in corresponding KR Application No. PCT/KR2021/002375, dated Sep. 1, 2021, 10 pages.
(Continued)

*Primary Examiner* — Michael V Kerrigan
(74) *Attorney, Agent, or Firm* — Burris Law, PLLC

(57) ABSTRACT

The present disclosure relates to an apparatus and method for performing generation of driving information and driver-specific start control for a two-wheeled vehicle on the basis of biometric recognition. Specifically, the present disclosure relates to an apparatus and method for controlling start of a two-wheeled vehicle limitedly to a driver identified on the basis of biometric recognition and generating driving information of the identified driver in relation to sudden turns, sudden acceleration, sudden stops, impact occurrence, speed limit violation, and the like while driving.

12 Claims, 4 Drawing Sheets

(51) Int. Cl.
  *B62J 50/22*    (2020.01)
  *G07C 5/02*    (2006.01)
  *G07C 5/00*    (2006.01)
  *B62H 5/20*    (2006.01)

(56) References Cited

U.S. PATENT DOCUMENTS

2015/0363986 A1   12/2015  Hoyos et al.
2016/0101728 A1   4/2016   Chan
2020/0086829 A1   3/2020   Wall et al.

FOREIGN PATENT DOCUMENTS

JP    2016081511 A    5/2016
JP    2020095315 A    6/2020
KR    1020170028357 A    3/2017
KR    102005040 B1    7/2019
KR    1020200033170 A    3/2020
KR    102493306 B1    1/2023

OTHER PUBLICATIONS

Decision to Grant issued in corresponding KR Application No. 10-2020-0176711, dated Jan. 2, 2023, and an English Translation, 4 pages.
Office Action issued in corresponding KR Application No. 10-2020-0176711, dated Jun. 23, 2022, and an English Translation, 17 pages.

* cited by examiner

APPARATUS AND METHOD FOR PERFORMING GENERATION OF DRIVING INFORMATION AND DRIVER-SPECIFIC START CONTROL FOR TWO-WHEELED VEHICLE ON BASIS OF BIOMETRIC RECOGNITION

CROSS-REFERENCE TO RELATED APPLICATIONS

The present application is a continuation of International Application No. PCT/KR2021/002375 filed Feb. 25, 2021, which claims priority to, and benefit of Korean Patent Application No. 10-2020-0176711 filed Dec. 16, 2020, the disclosures of which are incorporated by reference as if they are fully set forth herein.

FIELD

The present disclosure relates to an apparatus and method for performing generation of driving information and driver-specific start control for a two-wheeled vehicle on the basis of biometric recognition. More particularly, the present disclosure relates to an apparatus and method for controlling start of a two-wheeled vehicle only for a driver identified based on biometrics, and generating driving information on a sudden turn, sudden acceleration, a sudden stop, impact occurrence, a violation of speed limit, and the like, of the identified driver while driving.

BACKGROUND

The statements in this section merely provide background information related to the present disclosure and may not constitute prior art.

As the scale of delivery industry grows with the recent development of smartphone-based delivery applications, traffic safety issues of two-wheeled vehicles used for delivery are emerging socially. Since consumers demand a short delivery time, and delivery operators and drivers want to process more deliveries for the same time, traffic accidents of two-wheeled vehicles caused by reckless driving, speeding, a traffic law violation, and the like, occur frequently. Since the safety equipment of the two-wheeled vehicles is relatively poor compared to that of general passenger cars, the traffic accidents of the two-wheeled vehicles often lead to human casualties, and as a result, social costs are also increasing.

For social traffic safety and the stable management of the delivery business, insurance is needed to ensure the traffic safety of the two-wheeled vehicles. However, in a typical site in the delivery industry, multiple drivers hired on short-term contracts take turns driving on multiple two-wheeled vehicles possessed by delivery companies. That is, the number of drivers who drive specific two-wheeled vehicles is not fixed for one person. Since the driver driving the two-wheeled vehicle used for delivery is not fixed, it is difficult to determine who is driving the specific two-wheeled vehicle. Since it is difficult to determine who is driving the specific two-wheeled vehicle, it is difficult to collect information on usual driving habits of each driver. Therefore, due to difficulties in obtaining information on drivers of two-wheeled vehicles used for delivery, there is a problem in that it is not easy to set insurance rates for two-wheeled vehicles possessed by delivery companies.

Recently, the development of biometrics technology that may identify a person by extracting unique physical features of a human being is being actively developed. The biometrics technology is a security authentication technology that identifies a person's identity by measuring personal unique biometric information on a fingerprint, a face, an iris, a vein, or a voice, which is different for each person, with an automated device. The biometrics technology may be used to identify identities of people accessing a biometrics device within a pool of multiple people whose biometric information is collected.

Therefore, in a situation where there are many registered two-wheeled vehicles and many registered drivers, but it is not known which driver drives which of the registered two-wheeled vehicles, it is possible to identify who is driving a specific two-wheeled vehicle using the biometrics technology. In addition, when the identity of the driver of the two-wheeled vehicle may be identified, unique driving information may be generated for the identified driver.

Therefore, there is a need for an apparatus and method for performing generation of driving information and driver-specific start control for a two-wheeled vehicle on the basis of biometric recognition.

SUMMARY

This section provides a general summary of the disclosure and is not a comprehensive disclosure of its full scope or all of its features.

Based on the above discussion, the present disclosure provides an apparatus and method for performing generation of driving information and driver-specific start control for a two-wheeled vehicle on the basis of biometric recognition.

In addition, the present disclosure provides an apparatus and method for controlling start of a two-wheeled vehicle only for a driver identified based on biometrics, and generating driving information on a sudden turn, sudden acceleration, a sudden stop, impact occurrence, a violation of speed limit, and the like, of the identified driver while driving.

In addition, the present disclosure provides an apparatus and method for transmitting generated driver specific driving information to a server.

In addition, the present disclosure provides an apparatus and method for transmitting, to a server, information on whether integrity of previously transmitted driver-specific driving information is satisfied while driving depending on whether biometric information acquired while driving corresponds to biometric information of a driver corresponding to biometric information acquired during starting, and controlling the starting.

In addition, the present disclosure provides an apparatus and method for outputting a warning to a specified driver when unsafe driving, a violation of speed limit, and the like, of the driver occur.

In addition, the present disclosure provides an apparatus and method for specifying a driver based on biometrics and then receiving previous driving information of a specified driver from a server, and outputting the cumulative number of times of unsafe driving, a violation of speed limit, and the like, to inform the driver of the number of times of the unsafe driving, the violation of speed limit, and the like, occurring while driving.

According to an embodiment of the present disclosure, a method of operating a two-wheeled vehicle, the two-wheeled vehicle including at least one driving information sensor, a transceiver, a memory, and at least one processor includes: acquiring first biometric information of a driver by detecting biometric information of the driver of the two-wheeled vehicle using the at least one biometric sensor included in the two-wheeled vehicle or receiving the biometric information of the driver detected through at least one biometric sensor included in a terminal connected to the two-wheeled vehicle from the terminal through the transceiver; controlling starting of the two-wheeled vehicle using the at least one processor when the first biometric information corresponds to biometric information of at least one registered driver stored in the memory; generating driving information of the driver while the two-wheeled vehicle is driving using the at least one driving information sensor; transmitting identification information of the driver and the driving information of the driver stored in the memory to a server using the transceiver, the identification information of the driver corresponding to the first biometric information; detecting second biometric information of a current driver of the two-wheeled vehicle using the at least one biometric sensor included in the two-wheeled vehicle or confirming whether the terminal maintains a connection with the two-wheeled vehicle within a predetermined distance, periodically while driving or when stopped while driving after controlling the starting of the two-wheeled vehicle; and turning off the starting of the two-wheeled vehicle using the at least one processor when the second biometric information does not correspond to biometric information of a registered driver corresponding to the first biometric information or when the terminal does not maintain the connection with the two-wheeled vehicle within the predetermined distance.

According to an embodiment of the present disclosure, a two-wheeled vehicle includes at least one driving information sensor, a transceiver, a memory, and at least one processor, and there is provided a two-wheeled vehicle configured to perform a method of performing driver-specific starting control and driving information generation for a two-wheeled vehicle based on biometrics according to various embodiments of the present disclosure.

According to an embodiment of the present disclosure, there is provided a computer program recorded on a computer-readable storage medium, the program being configured to perform a method of performing driver-specific starting control and driving information generation for a two-wheeled vehicle based on biometrics according to various embodiments of the present disclosure.

According to the present disclosure, it is possible to provide an apparatus and method for performing generation of driving information and driver-specific start control for a two-wheeled vehicle on the basis of biometric recognition.

In addition, according to the present disclosure, it is possible to provide an apparatus and method for controlling start of a two-wheeled vehicle only for a driver identified based on biometrics, and generating driving information on a sudden turn, sudden acceleration, a sudden stop, impact occurrence, a violation of speed limit, and the like, of the identified driver while driving.

In addition, according to the present disclosure, it is possible to provide an apparatus and method for transmitting generated driver-specific driving information to a server.

In addition, according to the present disclosure, it is possible to provide an apparatus and method for transmitting, to a server, information on whether integrity of previously transmitted driver-specific driving information is satisfied while driving depending on whether biometric information acquired while driving corresponds to biometric information of a driver corresponding to biometric information acquired during starting, and controlling the starting.

In addition, according to the present disclosure, it is possible to provide an apparatus and method for outputting a warning to a specified driver when unsafe driving, a violation of speed limit, and the like, of the driver occur.

In addition, according to the present disclosure, it is possible to provide an apparatus and method for specifying a driver based on biometrics and then receiving previous driving information of a specified driver from a server, and outputting the cumulative number of times of unsafe driving, violations of speed limit, and the like, to inform the driver of the number of times of the unsafe driving, the violations of speed limit, or the like, occurring while driving.

Effects which can be achieved by the present disclosure are not limited to the above-described effects. That is, other objects that are not described may be obviously understood by those skilled in the art to which the present disclosure pertains from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
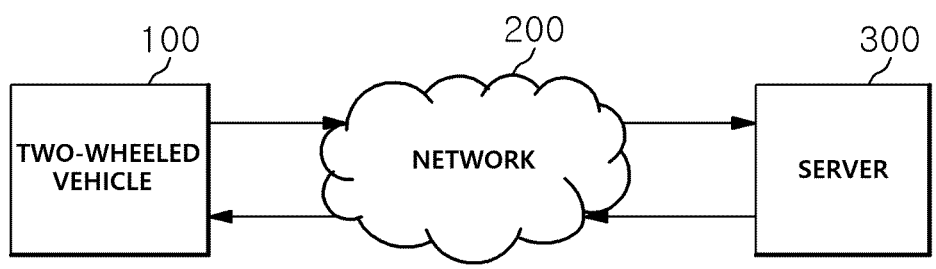
FIG. 1 is a diagram illustrating a communication network system of a two-wheeled vehicle and a server according to various embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, embodiments of the present disclosure will be described in detail with reference to the accompanying drawings so that those skilled in the art may easily practice the present disclosure. The present disclosure may be implemented in various different forms and is not limited to embodiments described herein.

In various embodiments of the present disclosure described below, a hardware approach will be described as an example. However, since various embodiments of the present disclosure include technology using both hardware and software, various embodiments of the present disclosure do not exclude a software-based approach.

FIG. 1 is a diagram illustrating a communication network system of a two-wheeled vehicle and a server according to various embodiments of the present disclosure.

Referring to FIG. 1, a communication system according to various embodiments of the present disclosure includes a two-wheeled vehicle 100, a communication network 200, and a server 300.

The two-wheeled vehicle 100 includes at least one biometric sensor, at least one driving information sensor, a transceiver, a memory, and at least one processor. After acquiring biometric information of a driver, the two-wheeled vehicle 100 controls starting based on the biometric information and generates driving information of a driver while driving. The two-wheeled vehicle 100 may transmit identification information of a driver and the driving information of the driver to the server 300 through the communication network 200. When the acquired biometric information corresponds to biometric information of at least one registered driver stored in the memory, the two-wheeled vehicle 100 may transmit a message indicating that the starting of the two-wheeled vehicle is controlled and the identification information of the driver to the server 300 through the communication network 200. The two-wheeled vehicle 100 may receive previous driving information of a driver from the server 300 through the communication network 200. The two-wheeled vehicle 100 may transmit information on a global positioning system (GPS) location of the two-wheeled vehicle 100 to the server 300 through the communication network 200, and receive information on speed limit based on the GPS location of the two-wheeled vehicle 100 from the server 300.

The communication network 200 provides a communication path along which the two-wheeled vehicle 100 and the server 300 may transmit and receive signals and data to and from each other. The communication network 200 is not limited to a communication method according to a specific communication protocol, and an appropriate communication method may be used according to an implementation example. For example, when configured as an Internet Protocol (IP)-based system, the communication network 200 may be implemented as an Internet network, and when the two-wheeled vehicle 100 and the server 300 are implemented as mobile communication terminals, the communication network 200 may be implemented as a wireless network such as a cellular network or a wireless local area network (WLAN) network.

The server 300 may receive the identification information of the driver, the driving information generated for the driver, identification information of a new driver, information on the GPS location of the two-wheeled vehicle 100, and the like, from the two-wheeled vehicle 100 through the communication network 200, and transmit, to the two-wheeled vehicle 100, insurance subscription information of a driver, previous driving information of a driver, information on speed limit based on the GPS location of the two-wheeled vehicle 100, and the like. The server 300 may store the driving information of the driver, the identification information of the new driver, the insurance subscription information of the driver, and the like, received from the two-wheeled vehicle 100.

Figure 2:
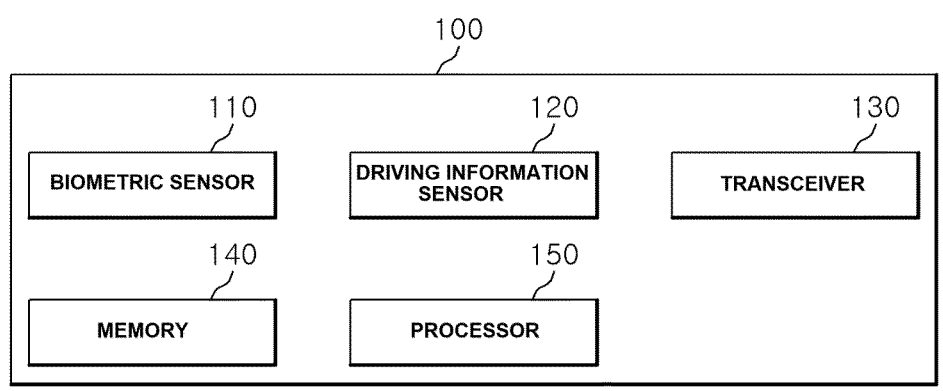
FIG. 2 shows a block diagram of a configuration of the two-wheeled vehicle according to various embodiments of the present disclosure.

FIG. 2 shows a block diagram of a configuration of the two-wheeled vehicle according to various embodiments of the present disclosure.

Referring to FIG. 2, the two-wheeled vehicle 100 according to various embodiments of the present disclosure includes at least one biometric sensor 110, at least one driving information sensor 120, a transceiver 130, a memory 140, and at least one processor 150.

The at least one biometric sensor 110 includes at least one of a vein recognition sensor, an iris recognition sensor, a face recognition sensor, a voice recognition sensor, or a fingerprint recognition sensor. At least one biometric sensor 110 is configured to generate the biometric information of the driver of the two-wheeled vehicle 100. The biometric information includes at least one of the vein information, the iris information, the face information, the voice information, or the fingerprint information. According to various embodiments of the present disclosure, when the two-wheeled vehicle receives, from a terminal connected to the two-wheeled vehicle through communication with the terminal, the biometric information of the driver detected through at least one biometric sensor included in the terminal, the two-wheeled vehicle may not include a separate biometric sensor 110 because it is sufficient to use the at least one biometric sensor included in the terminal in order to acquire the biometric information of the driver.

The at least one driving information sensor 120 includes at least one of a global positioning system (GPS) sensor, a gyroscope sensor, a geomagnetic sensor, or an acceleration sensor. The at least one driving information sensor 120 is configured to generate the driving information of the driver of the two-wheeled vehicle 100. The driving information includes at least one of a lateral gradient of the two-wheeled vehicle 100 while driving, a rotation angle of the two-wheeled vehicle 100 while driving, acceleration of the two-wheeled vehicle 100 while driving, speed of the two-wheeled vehicle 100 while driving, whether an impact occurs while the two-wheeled vehicle 100 is driving, or a driving path of the two-wheeled vehicle 100. According to an embodiment, the driving information may further include whether the vehicle violated the speed limit based on whether the speed of the two-wheeled vehicle 100 while driving is greater than speed limit based on a GPS location of the two-wheeled vehicle 100.

The transceiver 130 is connected to the at least one processor 150 and transmits and/or receives a signal. All or part of the transceiver 130 may be referred to as a transmitter, a receiver, or a transceiver. The transceiver 130 may support at least one of various wireless communication standards, such as institute of electrical and electronics engineers (IEEE) 802.xx system, IEEE Wi-Fi system, $3^{rd}$ generation partnership project (3GPP) system, 3GPP long term evolution (LTE) system, 3GPP 5G new radio (NR) system, 3GPP2 system, and Bluetooth, which are wired access systems and wireless access systems.

The memory 140 is connected to the at least one biometric sensor 110 and the at least one driving information sensor 120, and may store the biometric information of the driver of the two-wheeled vehicle 100 generated by the at least one biometric sensor 110, the driving information of the driver of the two-wheeled vehicle 100 generated by the at least one driving information sensor 120, and the like. In addition, the memory 140 may be connected to the transceiver 130 and store images, information, and the like, received through communication. In addition, the memory 140 is connected to the at least one processor 150 and may store data such as a basic program for an operation of the at least one processor 150, an application program, setting information, and information generated by a calculation of the at least one processor 150. The memory 140 may be composed of volatile memory, non-volatile memory, or a combination of volatile and non-volatile memory. Also, the memory 140 may provide stored data according to a request of the at least one processor 150.

The at least one processor 150 may be configured to implement procedures and/or methods proposed in the present disclosure. The at least one processor 150 controls overall operations of the two-wheeled vehicle 100 to perform driver-specific starting control and driving information generation for the two-wheeled vehicle 100 based on biometrics. For example, the at least one processor 150 generates the biometric information of the driver of the two-wheeled vehicle 100 through the at least one biometric sensor 110. Also, the at least one processor 150 generates the driving information of the driver of the two-wheeled vehicle 100 through the at least one driving information sensor 120. In addition, the at least one processor 150 transmits or receives information, and the like, through the transceiver 130. Also, the at least one processor 150 writes data to and reads data from the memory 140.

Additionally, the two-wheeled vehicle 100 may further include a GPS module. The at least one processor 150 may be configured to transmit information on the GPS location of the two-wheeled vehicle 100 confirmed by the GPS module to the server 300 through the transceiver 130.

Additionally, the two-wheeled vehicle 100 may further include at least one of a display or a speaker. The at least one processor 150 may output a warning display or a warning sound to the driver of the two-wheeled vehicle 100 by controlling at least one of the display or the speaker when a specific condition for abnormal driving is satisfied.

Additionally, the two-wheeled vehicle 100 may include an input unit. The input unit is connected to the at least one processor 150 and may input identification information, and the like, on a new driver of the two-wheeled vehicle 100. According to one embodiment, the input unit may include a touch display, a keypad, and the like.

Additionally, the two-wheeled vehicle 100 may include a starting control button. The starting control button may input a start of starting in a state where the starting is turned off, and input a turn-off of the starting in a state where the starting is turned on. According to various embodiments of the present disclosure, even when the start of the starting or the turn-off of the starting is input through the starting control button, the start of the starting or the turn-off of the starting is not controlled immediately, it is determined whether the starting control condition is satisfied through the processor 150, and then the start of the starting or the turn-off of the starting may be controlled.

Figure 3:
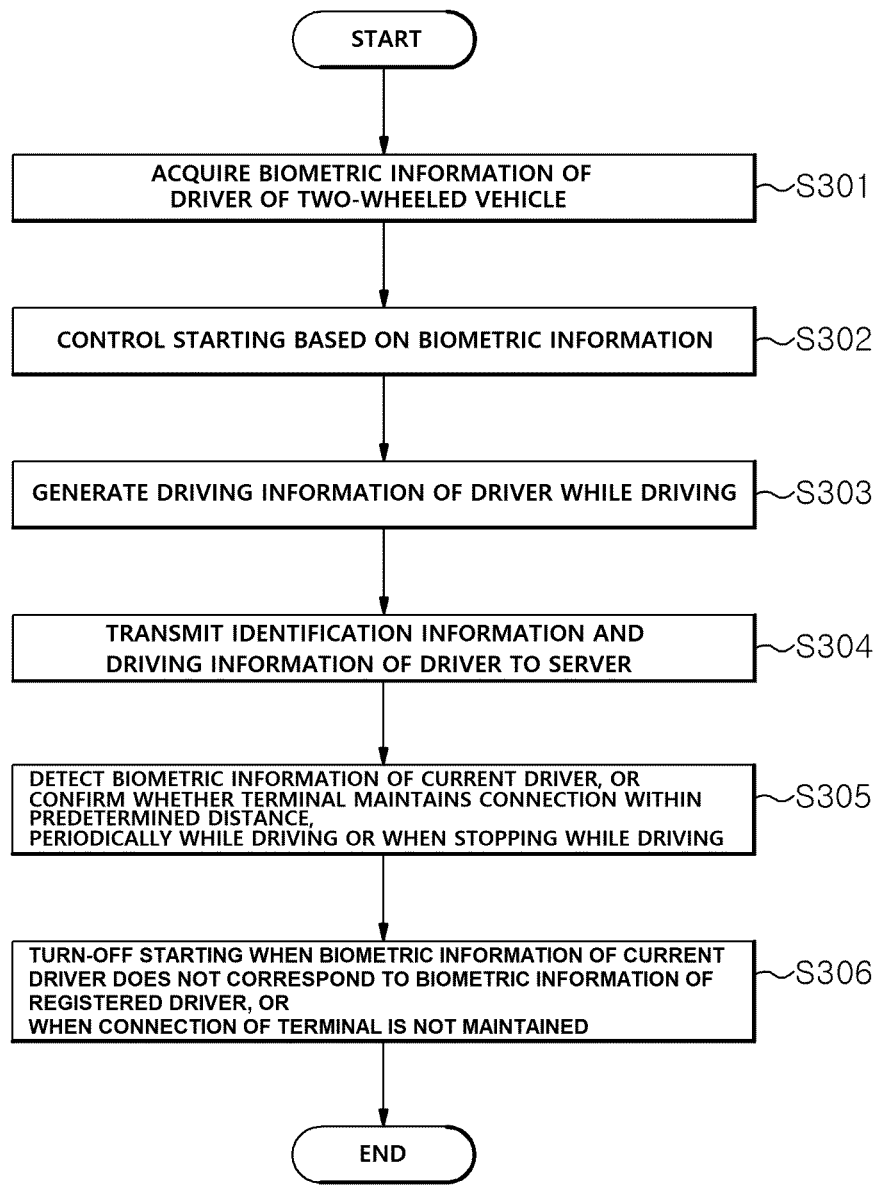
FIG. 3 is a flowchart illustrating a method of operating a two-wheeled vehicle according to various embodiments of the present disclosure.

FIG. 3 is a flowchart illustrating a method of operating a two-wheeled vehicle according to various embodiments of the present disclosure. In the embodiment of FIG. 3, the two-wheeled vehicle includes at least one driving information sensor, a transceiver, a memory, and at least one processor.

Referring to FIG. 3, in operation S301, the two-wheeled vehicle detects the biometric information of the driver of the two-wheeled vehicle using the at least one biometric sensor included in the two-wheeled vehicle or receive the biometric information of the driver detected through the at least one biometric sensor included in the terminal from the terminal connected to the two-wheeled vehicle through the transceiver, thereby acquiring first biometric information of the driver of the two-wheeled vehicle. According to various embodiments of the present disclosure, the at least one biometric sensor included in the two-wheeled vehicle or at least one biometric sensor included in the terminal may include at least one of a vein recognition sensor, an iris recognition sensor, a face recognition sensor, a voice recognition sensor, or a fingerprint recognition sensor, and the biometric information may include at least one of vein information, iris information, face information, voice information, or fingerprint information. According to various embodiments of the present disclosure, a short-range communication connection such as a WLAN or Bluetooth may be performed between the terminal and the two-wheeled vehicle, and the terminal may transmit the biometric information of the driver detected through the biometric sensor in the terminal to the two-wheeled vehicle through WLAN or Bluetooth communication. According to various embodiments of the present disclosure, the terminal may correspond to a transceiver for supporting WLAN or Bluetooth communication, such as a smartphone or a tablet computer, and a smart wireless communication device including a biometric sensor. According to various embodiments of the present disclosure, when the two-wheeled vehicle receives the biometric information of the driver through communication with the terminal, the two-wheeled vehicle may not include a separate biometric sensor because it is sufficient to use the at least one biometric sensor in the terminal.

In operation S302, the two-wheeled vehicle uses at least one processor to control starting of the two-wheeled vehicle when the first biometric information corresponds to biometric information of at least one registered driver stored in a memory. According to various embodiments of the present disclosure, the method of operating a two-wheeled vehicle according to the embodiment of FIG. 3 may further include transmitting information on starting attempt of an unregistered driver to a server using a transceiver when the first biometric information does not correspond to the biometric information of the at least one registered driver stored in the memory.

In operation S303, the two-wheeled vehicle generates the driving information of the driver while the two-wheeled vehicle is driving using at least one driving information sensor. According to various embodiments of the present disclosure, the at least one driving information sensor may include at least one of a GPS sensor, a gyroscope sensor, a geomagnetic sensor, or an acceleration sensor. In addition, the driving information may include at least one of a lateral gradient of the two-wheeled vehicle while driving, a rotation angle of the two-wheeled vehicle while driving, acceleration of the two-wheeled vehicle while driving, speed of the two-wheeled vehicle while driving, whether an impact occurs while the two-wheeled vehicle is driving, or a driving path of the two-wheeled vehicle.

According to various embodiments of the present disclosure, the driving information may include at least one of whether the two-wheeled vehicle is driving unstably based on whether the lateral gradient of the two-wheeled vehicle while driving is greater than a critical gradient, whether a sudden turn occurs based on whether the rotation angle of the two-wheeled vehicle while driving is greater than a critical rotation angle, or sudden acceleration/sudden stop occurs based on whether an absolute value of acceleration of the two-wheeled vehicle while driving is greater than critical acceleration.

According to various embodiments of the present disclosure, the driving information may further include at least one of the number of times of unstable driving per unit driving distance which is an average value of a predetermined unit driving distance for the number of times the lateral gradient of the two-wheeled vehicle while driving is greater than the critical gradient, the average number of times of sudden turns per unit driving distance which is an average value of a predetermined unit driving distance for the number of times the rotation angle of the two-wheeled vehicle while driving is greater than the critical rotation angle, or the number of times of sudden accelerations/sudden stops per unit driving distance which is an average value of a predetermined unit driving distance for the number of times the absolute value of the acceleration of the two-wheeled vehicle while driving is greater than the critical acceleration.

According to various embodiments of the present disclosure, the driving information may further include the number of times of violations of speed limit for each unit driving distance which is an average value of a predetermined unit driving distance for the number of times the speed of the two-wheeled vehicle while driving is greater than the speed limit.

In operation S304, the two-wheeled vehicle transmits the identification information of the driver and the driving information of the driver stored in the memory to the server using the transceiver. Here, the identification information of the driver corresponds to the first biometric information.

According to various embodiments of the present disclosure, the method of operating a two-wheeled vehicle according to the embodiment of FIG. 3 may further include transmitting the information on the GPS location of the two-wheeled vehicle to the server using the transceiver, and receiving the information on the speed limit on based on the GPS location of the two-wheeled vehicle from the server using the transceiver. In addition, the driving information may further include whether the speed limit of the two-wheeled vehicle is violated based on whether the speed of the two-wheeled vehicle while driving is greater than the speed limit.

According to various embodiments of the present disclosure, the method of operating a two-wheeled vehicle according to the embodiment of FIG. 3 may further include transmitting a registration request message for a new driver and identification information of the new driver of the two-wheeled vehicle to the server using the transceiver, receiving a registration acceptance message of the new driver of the two-wheeled vehicle from the server using the transceiver when the new driver is registered in the server as an insured driver for the two-wheeled vehicle, acquiring biometric information of the new driver by detecting the biometric information of the new driver using the at least one biometric sensor included in the two-wheeled vehicle in response to receiving the registration acceptance message and receiving biometric information of the new driver detected through the at least one biometric sensor included in a new terminal connected to the two-wheeled vehicle from the new terminal through the transceiver, and storing the acquired biometric information of the new driver in the memory as the biometric information of the registered driver.

According to various embodiments of the present disclosure, the two-wheeled vehicle according to the embodiment of FIG. 3 may further include at least one of a display or a speaker. In this case, the method of operating a two-wheeled vehicle according to the embodiment of FIG. 3 may further include outputting a warning display or warning sound using at least one of the display or the speaker in at least one of the case where the speed of the two-wheeled vehicle while driving is greater than the speed limit, the case where the lateral gradient of the two-wheeled vehicle while driving is greater than the critical gradient, the case where the rotation angle of the two-wheeled vehicle while driving is greater than the critical rotation angle, or the case where the absolute value of the acceleration of the two-wheeled vehicle while driving is greater than the critical acceleration. In this case, the driving information may further include, after the warning display or warning sound is output, whether at least one of a state in which the speed of the two-wheeled vehicle while driving is greater than the speed limit, a state in which the lateral gradient of the two-wheeled vehicle while driving is greater than the critical gradient, a state in which the rotation angle of the two-wheeled vehicle while driving is greater than the critical rotation angle, or a state in which the absolute value of the acceleration of the two-wheeled vehicle while driving is greater than the critical acceleration is maintained.

According to various embodiments of the present disclosure, the method of operating a two-wheeled vehicle according to the embodiment of FIG. 3 may further include transmitting, to the server, a message indicating that the starting of the two-wheeled vehicle is controlled and the identification information of the driver when the acquired biometric information corresponds to biometric information of at least one registered driver stored in a memory, receiving previous driving information of a driver from the server, the previous driving information including at least one of the previous cumulative number of times of unstable driving of the driver, the previous cumulative number of times of sudden turns, the previous cumulative number of times of sudden accelerations/sudden stops, or the previous cumulative number of times of violations of speed limit, and outputting at least one of the cumulative number of times of unstable driving of the driver, the cumulative number of times of sudden turns, the cumulative number of times of sudden accelerations/sudden stops, or the cumulative number of times of violations of speed limit using at least one of the display or the speaker in at least one of the case where the speed of the two-wheeled vehicle while driving is greater than the speed limit, the case where the lateral gradient of the two-wheeled vehicle while driving is greater than the critical gradient, the case where the rotation angle of the two-wheeled vehicle while driving is greater than the critical rotation angle, the case where the absolute value of the acceleration of the two-wheeled vehicle while driving is greater than the critical acceleration, or the case where the speed of the two-wheeled vehicle while driving is greater than the speed limit.

In operation S305, the at least one biometric sensor is used to detect second biometric information of the current driver of the two-wheeled vehicle or confirm whether the terminal is connected to the two-wheeled vehicle within a predetermined distance, periodically while driving or when stopped while driving after controlling the starting of the two-wheeled vehicle. According to various embodiments of the present disclosure, a method of confirming whether a terminal maintains a connection with a two-wheeled vehicle within a predetermined distance may include a method of confirming whether a short-range communication connection between the terminal and the two-wheeled vehicle, such as a WLAN or Bluetooth, is maintained.

In operation S306, when the second biometric information does not correspond to the biometric information of the registered driver corresponding to the first biometric information or the terminal does not maintain the connection with the two-wheeled vehicle within a predetermined distance, the starting of the two-wheeled vehicle is turned off by at least one processor.

According to various embodiments of the present disclosure, the two-wheeled vehicle further includes at least one of the display or the speaker, and in operation S306, the two-wheeled vehicle may output a warning message indicating that the starting of the two-wheeled vehicle may be turned off using at least one of the display or the speaker, and detect third biometric information of a current driver of the two-wheeled vehicle using the at least one biometric sensor within a predetermined time after the warning message is output or confirm whether the terminal maintains the connection with the two-wheeled vehicle within a predetermined distance, and the starting of the two-wheeled vehicle may be turned off using the at least one processor when the third biometric information does not correspond to the biometric information of the registered driver corresponding to the first biometric information or when the terminal does not maintain the connection with the two-wheeled vehicle within a predetermined distance.

According to various embodiments of the present disclosure, as the second biometric information does not correspond to the biometric information of the registered driver corresponding to the first biometric information or the terminal does not maintain the connection with the two-wheeled vehicle within a predetermined distance, when the starting of the two-wheeled vehicle is turned off, the two-wheeled vehicle may transmit, to the server, a message indicating that the integrity of the previously transmitted driving information is not satisfied using the transceiver. According to various embodiments of the present disclosure, the two-wheeled vehicle may transmit, to the server, a message indicating that the biometric information of the registered driver has been stolen together with the message indicating that the integrity of the previously transmitted driving information is not satisfied.

According to various embodiments of the present disclosure, the two-wheeled vehicle further includes a starting end button, and when a starting end is input to the two-wheeled vehicle through the starting end button, the two-wheeled vehicle detects the third biometric information of the current driver of the two-wheeled vehicle using at least one biometric sensor or confirms whether the terminal maintains the connection with the two-wheeled vehicle within a predetermined distance, and when the third biometric information corresponds to the biometric information of the registered driver corresponding to the first biometric information or the terminal maintains the connection with the two-wheeled vehicle within a predetermined distance, the two-wheeled vehicle may transmit, to the server, the message indicating that the integrity of the previously transmitted driving information is satisfied from the driving start time to the driving end time and the starting of the two-wheeled vehicle may be turned off.

Figure 4:
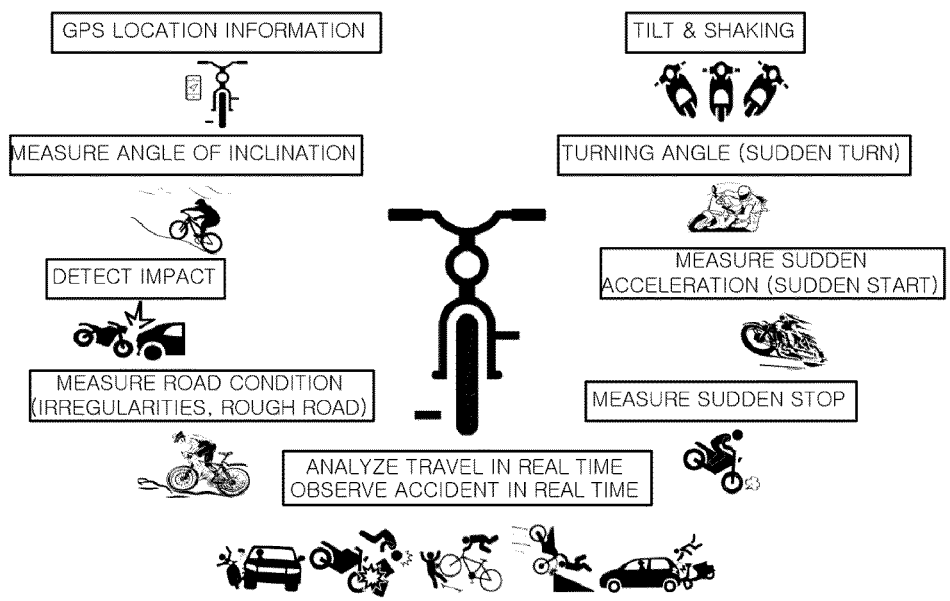
FIG. 4 is a diagram illustrating a driving information generation process of a driver while the two-wheeled vehicle is driving according to various embodiments of the present disclosure.

FIG. 4 is a diagram illustrating a driving information generation process of a driver while driving the two-wheeled vehicle according to various embodiments of the present disclosure.

Specifically, FIG. 4 illustrates examples of various types of driving information that may be generated by the at least one driving information sensor included in the two-wheeled vehicle.

According to various embodiments of the present disclosure, the at least one driving information sensor may include at least one of a GPS sensor, a gyroscope sensor, a geomagnetic sensor, or an acceleration sensor.

According to various embodiments of the present disclosure, the driving information may include at least one of the lateral gradient of the two-wheeled vehicle while driving, the rotation angle of the two-wheeled vehicle while driving, the acceleration of the two-wheeled vehicle while driving, the speed of the two-wheeled vehicle while driving, whether an impact occurs while the two-wheeled vehicle is driving, whether an accident occurred while the two-wheeled vehicle is driving, the GPS location of the two-wheeled vehicle, a gradient of a driving road of the two-wheeled vehicle, a road surface condition of the driving road of the two-wheeled vehicle, or a driving path of the two-wheeled vehicle.

According to various embodiments of the present disclosure, the driving information may further include at least one of whether the two-wheeled vehicle is driving unstably based on whether the lateral gradient of the two-wheeled vehicle while driving is greater than the critical gradient, whether the sudden turn occurs based on whether the rotation angle of the two-wheeled vehicle while driving is greater than the critical rotation angle, whether an accident occurs based on whether a value of an impact amount of the two-wheeled vehicle while driving is greater than a critical value of impact amount, road surface condition information based on whether a value of shaking of the two-wheeled vehicle while driving is greater than a critical value of shaking, or whether the sudden acceleration/sudden stop occurs based on whether the absolute value of the acceleration of the two-wheeled vehicle while driving is greater than the critical acceleration.

According to various embodiments of the present disclosure, the driving information may further include at least one of the number of times of unstable driving per unit driving distance which is the average value of a predetermined unit driving distance for the number of times the lateral gradient of the two-wheeled vehicle while driving is greater than the critical gradient, the average number of times of sudden turns per unit driving distance which is the average value of a predetermined unit driving distance for the number of times the rotation angle of the two-wheeled vehicle while driving is greater than the critical rotation angle, or the number of times of sudden accelerations/sudden stops per unit driving distance which is the average value of a predetermined unit driving distance for the number of times the absolute value of the acceleration of the two-wheeled vehicle while driving is greater than the critical acceleration.

According to various embodiments of the present disclosure, the driving information may further include the number of times of the violation of speed limit for each unit driving distance which is the average value of a predetermined unit driving distance for the number of times the speed of the two-wheeled vehicle while driving is greater than the speed limit.

In the case of implementing the embodiment of the present disclosure using hardware, application specific integrated circuits (ASICs), digital signal processors (DSPs), digital signal processing devices (DSPDs), programmable logic devices (PLDs), field programmable gate arrays (FPGAs), or the like, that are configured to perform the present disclosure may be provided in the processor of the present disclosure.

Meanwhile, the above-described method can be written as a program that may be executed on a computer, and can be implemented in a general-purpose digital computer that operates the programs using a computer-readable recording medium. In addition, the structure of data used in the above-described method may be recorded on a computer-readable storage medium through various means. Program storage devices, which may be used to describe a storage device including executable computer codes for performing various methods of the present disclosure, should not be construed as including transitory objects such as carrier waves or signals. The computer-readable recording medium includes storage media such as magnetic storage media (e.g., a read-only memory (ROM), a floppy disk, a hard disk, or the like.) and optically readable media (e.g., a compact disc read-only memory (CD-ROM), a digital video disc (DVD), or the like.).

In the above-described embodiments, components and features of the present disclosure are combined with each other in a predetermined form. It is to be considered that the respective components or features are selective unless separately explicitly mentioned. The respective components or features may be implemented in a form in which the respective components or features are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or replaced by corresponding components or features of another embodiment. It is obvious that claims that do not have an explicitly referred relationship in the claims may be combined with each other to configure an embodiment or be included in new claims by amendment after application.

It will be obvious to those skilled in the art that the present disclosure may be embodied in other forms without departing from the technical spirit and essential features of the present disclosure. Accordingly, the above embodiments should be considered in all respects as illustrative rather than restrictive. The scope of the present disclosure should be determined by reasonable interpretation of the appended claims and all possible changes within the equivalent scope of the present disclosure.

INDUSTRIAL APPLICABILITY

The present disclosure relates to an apparatus and method for performing generation of driving information and driver-specific start control for a two-wheeled vehicle on the basis of biometric recognition. More particularly, the present disclosure relates to an apparatus and method for controlling start of a two-wheeled vehicle only for a driver identified based on biometrics, and generating driving information on a sudden turn, sudden acceleration, a sudden stop, impact occurrence, a violation of speed limit, and the like, of the identified driver while driving.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating a two-wheeled vehicle, the two-wheeled vehicle including at least one driving information sensor, a transceiver, a memory, and at least one processor, the method comprising:
    acquiring first biometric information of a driver by detecting biometric information of the driver of the two-wheeled vehicle using the at least one biometric sensor included in the two-wheeled vehicle or receiving the biometric information of the driver detected through at least one biometric sensor included in a terminal connected to the two-wheeled vehicle from the terminal through the transceiver;
    controlling starting of the two-wheeled vehicle using the at least one processor when the first biometric information corresponds to biometric information of at least one registered driver stored in the memory;
    generating driving information of the driver while the two-wheeled vehicle is driving using the at least one driving information sensor;
    transmitting identification information of the driver and the driving information of the driver stored in the memory to a server using the transceiver, the identification information of the driver corresponding to the first biometric information;
    detecting second biometric information of a current driver of the two-wheeled vehicle using the at least one biometric sensor included in the two-wheeled vehicle or confirming whether the terminal maintains a connection with the two-wheeled vehicle within a predetermined distance, periodically while driving or when stopped while driving after controlling the starting of the two-wheeled vehicle; and turning off the starting of the two-wheeled vehicle using the at least one processor when the second biometric information does not correspond to biometric information of a registered driver corresponding to the first biometric information or when the terminal does not maintain the connection with the two-wheeled vehicle within the predetermined distance, wherein the two-wheeled vehicle further includes a starting control button, the method of operating a two-wheeled vehicle further includes:

when a starting end is input to the two-wheeled vehicle through the starting control button, detecting third biometric information of the current driver of the two-wheeled vehicle using the at least one biometric sensor included in the two-wheeled vehicle or confirming that the terminal maintains the connection with the two-wheeled vehicle within the predetermined distance;

when the third biometric information corresponds to the biometric information of the registered driver corresponding to the first biometric information or when the terminal maintains the connection with the two-wheeled vehicle within the predetermined distance, transmitting to the server a message indicating that integrity of previously transmitted driving information is satisfied from a driving start time to a driving end time using the transceiver; and turning off the starting of the two-wheeled vehicle.

2. The method of claim 1, further comprising, when the starting of the two-wheeled vehicle is turned off as the second biometric information does not correspond to the biometric information of the registered driver corresponding to the first biometric information or the terminal does not maintain the connection with the two-wheeled vehicle within the predetermined distance, transmitting, to the server, a message indicating that the integrity of the previously transmitted driving information is not satisfied using the transceiver.

3. The method of claim 1, wherein the at least one biometric sensor included in the two-wheeled vehicle or the at least one biometric sensor included in the terminal includes at least one of a vein recognition sensor, an iris recognition sensor, a face recognition sensor, a voice recognition sensor, or a fingerprint recognition sensor, the first biometric information and the second biometric information include at least one of vein information, iris information, face information, voice information, or fingerprint information, the at least one driving information sensor includes at least one of a global positioning system (GPS) sensor, a gyroscope sensor, a geomagnetic sensor, or an acceleration sensor, and the driving information includes at least one of a lateral gradient of the two-wheeled vehicle while driving, a rotation angle of the two-wheeled vehicle while driving, acceleration of the two-wheeled vehicle while driving, speed of the two-wheeled vehicle while driving, whether an impact occurs while the two-wheeled vehicle is driving, or a driving path of the two-wheeled vehicle.

4. The method of claim 3, further comprising:

transmitting information on a GPS location of the two-wheeled vehicle to the server using the transceiver, and receiving information on a speed limit based on the GPS location of the two-wheeled vehicle from the server using the transceiver, wherein the driving information further includes whether the speed limit of the two-wheeled vehicle is violated based on whether the speed of the two-wheeled vehicle while driving is greater than the speed limit, and the number of times of violations of speed limit for each unit driving distance which is an average value of a predetermined unit driving distance for the number of times the speed of the two-wheeled vehicle while driving is greater than the speed limit.

5. The method of claim 4, wherein the two-wheeled vehicle further includes at least one of a display or a speaker, and the method of operating a two-wheeled vehicle further includes outputting a warning display or warning sound using at least one of the display or the speaker in at least one of the case where the speed of the two-wheeled vehicle while driving is greater than the speed limit, the case where the lateral gradient of the two-wheeled vehicle while driving is greater than the critical gradient, the case where the rotation angle of the two-wheeled vehicle while driving is greater than the critical rotation angle, the case where the absolute value of the acceleration of the two-wheeled vehicle while driving is greater than the critical acceleration, or the case where the speed of the two-wheeled vehicle while driving is greater than the speed limit, and the driving information further includes, after the warning display or warning sound is output, whether at least one of a state in which the speed of the two-wheeled vehicle while driving is greater than the speed limit, a state in which the lateral gradient of the two-wheeled vehicle while driving is greater than the critical gradient, a state in which the rotation angle of the two-wheeled vehicle while driving is greater than the critical rotation angle, a state in which the absolute value of the acceleration of the two-wheeled vehicle while driving is greater than the critical acceleration, or a state in which the speed of the two-wheeled vehicle while driving is greater than the speed limit is maintained.

6. The method of claim 5, further comprising:

transmitting, to the server, a message indicating that the starting of the two-wheeled vehicle is controlled and the identification information of the driver when the acquired biometric information corresponds to biometric information of at least one registered driver stored in a memory;

receiving previous driving information of the driver from the server, the previous driving information including at least one of the previous cumulative number of times of unstable driving of the driver, the previous cumulative number of times of sudden turns, the previous cumulative number of times of sudden accelerations/sudden stops, or the previous cumulative number of times of violations of speed limit; and outputting at least one of the cumulative number of times of unstable driving of the driver, the cumulative number of times of sudden turns, the cumulative number of times of sudden accelerations/sudden stops, or the cumulative number of times of violations of speed limit using at least one of the display or the speaker in at least one of the case where the speed of the two-wheeled vehicle while driving is greater than the speed limit, the case where the lateral gradient of the two-wheeled vehicle while driving is greater than the critical gradient, the case where the rotation angle of the two-wheeled vehicle while driving is greater than the critical rotation angle, the case where the absolute value of the acceleration of the two-wheeled vehicle while driving is greater than the critical acceleration, or the case where the speed of the two-wheeled vehicle while driving is greater than the speed limit.

7. The method of claim 3, wherein the driving information further includes at least one of whether the two-wheeled vehicle is driving unstably based on whether the lateral gradient of the two-wheeled vehicle while driving is greater than a critical gradient, whether a sudden turn occurs based on whether the rotation angle of the two-wheeled vehicle while driving is greater than a critical rotation angle, whether sudden acceleration/sudden stop occurs based on whether an absolute value of acceleration of the two-wheeled vehicle while driving is greater than critical acceleration, the number of times of unstable driving per unit driving distance which is an average value of a predetermined unit driving distance for the number of times the lateral gradient of the two-wheeled vehicle while driving is greater than the critical gradient, the average number of times of sudden turns per unit driving distance which is an average value of a predetermined unit driving distance for the number of times the rotation angle of the two-wheeled vehicle while driving is greater than the critical rotation angle, or the number of times of sudden accelerations/sudden stops per unit driving distance which is an average value of a predetermined unit driving distance for the number of times the absolute value of the acceleration of the two-wheeled vehicle while driving is greater than the critical acceleration.

8. The method of claim 1, wherein the two-wheeled vehicle further includes at least one of a display or a speaker, and
the turning off of the starting of the two-wheeled vehicle using the at least one processor when the second biometric information does not correspond to biometric information of a registered driver corresponding to the first biometric information or when the terminal does not maintain the connection with the two-wheeled vehicle within the predetermined distance includes:
outputting a warning message indicating that the starting of the two-wheeled vehicle is turned off using at least one of the display or the speaker;
detecting third biometric information of a current driver of the two-wheeled vehicle using the at least one biometric sensor included in the two-wheeled vehicle within a predetermined time after the warning message is output or confirming whether the terminal maintains the connection with the two-wheeled vehicle within the predetermined distance; and
turning off the starting of the two-wheeled vehicle using the at least one processor when the third biometric information does not correspond to the biometric information of the registered driver corresponding to the first biometric information or when the terminal does not maintain the connection with the two-wheeled vehicle within the predetermined distance.

9. The method of claim 1, further comprising:
transmitting a registration request message for a new driver and identification information of the new driver of the two-wheeled vehicle to the server using the transceiver;
receiving a registration acceptance message of the new driver of the two-wheeled vehicle from the server using the transceiver when the new driver is registered in the server as an insured driver for the two-wheeled vehicle;
acquiring biometric information of the new driver by detecting the biometric information of the new driver using the at least one biometric sensor included in the two-wheeled vehicle in response to receiving the registration acceptance message and receiving biometric information of the new driver detected through at least one biometric sensor included in a new terminal connected to the two-wheeled vehicle from the new terminal through the transceiver; and
storing the acquired biometric information of the new driver in the memory as the biometric information of the registered driver.

10. The method of claim 1, further comprising transmitting information on starting attempt of an unregistered driver to the server using the transceiver to the server when the first biometric information does not correspond to biometric information of at least one registered driver stored in the memory.

11. A two-wheeled vehicle, comprising:
at least one driving information sensor, a transceiver, a memory, and at least one processor, and
wherein the two-wheeled vehicle is configured to perform the method according to claim 1.

12. A computer program recorded on a computer-readable storage medium, the program being configured to perform the method of claim 1.

* * * * *